US010325093B1

(12) United States Patent
Kumar et al.

(10) Patent No.: US 10,325,093 B1
(45) Date of Patent: Jun. 18, 2019

(54) TECHNIQUES FOR PROTECTING AGAINST UNAUTHORIZED TECH SUPPORT CALLS

(71) Applicant: Symantec Corporation, Mountain View, CA (US)

(72) Inventors: Anudeep Kumar, Meerut (IN); Vipul Sawant, Pune (IN)

(73) Assignee: SYMANTEC CORPORATION, Mountain View, CA (US)

(*) Notice: Subject to any disclaimer, the term of this patent is extended or adjusted under 35 U.S.C. 154(b) by 166 days.

(21) Appl. No.: 15/372,012

(22) Filed: Dec. 7, 2016

(51) Int. Cl.
*G06F 21/55* (2013.01)
*H04M 3/51* (2006.01)

(52) U.S. Cl.
CPC ............ *G06F 21/554* (2013.01); *H04M 3/51* (2013.01); *G06F 2221/034* (2013.01)

(58) Field of Classification Search
CPC .................. G06F 21/554; G06F 2221/034
USPC ............................................................ 726/23
See application file for complete search history.

(56) References Cited

U.S. PATENT DOCUMENTS

| | | | | |
|---|---|---|---|---|
| 9,185,626 B1* | 11/2015 | Kunkel | ................. | H04W 40/02 |
| 9,330,254 B1* | 5/2016 | Xue | ...................... | G06F 21/554 |
| 2005/0233733 A1* | 10/2005 | Roundtree | .......... | G06F 9/45512 |
| | | | | 455/414.1 |
| 2006/0075001 A1* | 4/2006 | Canning | ................... | G06F 8/65 |
| 2009/0199296 A1* | 8/2009 | Xie | ....................... | G06F 21/316 |
| | | | | 726/23 |
| 2010/0251346 A1* | 9/2010 | Dumais | ................... | G06F 21/10 |
| | | | | 726/5 |
| 2011/0211682 A1* | 9/2011 | Singh | ...................... | H04M 1/57 |
| | | | | 379/142.05 |
| 2015/0215335 A1* | 7/2015 | Giuliani | ............. | H04L 63/1441 |
| | | | | 726/23 |
| 2016/0309040 A1* | 10/2016 | Cinar | ...................... | H04L 51/18 |
| 2017/0004340 A1* | 1/2017 | Powell | ................. | G06K 7/0004 |
| 2017/0019777 A1* | 1/2017 | Cole, Jr. | ................. | H04W 4/90 |
| 2017/0262891 A1* | 9/2017 | Green | ............... | H04M 3/42059 |

* cited by examiner

*Primary Examiner* — Harunur Rashid
*Assistant Examiner* — Sakinah White Taylor
(74) *Attorney, Agent, or Firm* — Maschoff Brennan (57) ABSTRACT

Techniques for protecting against unauthorized technique support calls are disclosed. In one embodiment, the techniques may be realized as a system for protecting against unauthorized technique support calls including one or more computer processors. The one or more computer processors may be configured to register a client security application installed on a client device. The client security application may be associated with a mobile device. The client device may be separate from the mobile device. The one or more computer processors may further be configured to receive a notification to start monitoring the client device. The one or more computer processors may further be configured to monitor activities of the client device. The one or more computer processors may further be configured to alert a user of the client device for security risks associated with the activities.

13 Claims, 5 Drawing Sheets

TECHNIQUES FOR PROTECTING AGAINST UNAUTHORIZED TECH SUPPORT CALLS

FIELD OF THE DISCLOSURE

The present disclosure relates generally to protecting systems and devices against security risks, and more particularly, to techniques for protecting against unauthorized tech support calls.

BACKGROUND OF THE DISCLOSURE

Recent years have witnessed an increase in tech support scams. For example, a tech support scam may involve call center workers cold-calling users, trying to sell them technical support packages to resolve non-existent problems on intended victims' computers. Seemingly professional-sounding call center staff may try to convince intended victims to install malware and/or other unwanted applications onto the victims' computers, while claiming such installation will fix certain problems. Recently, tech support scammers were found using the so-called Nuclear exploit kit to drop ransomware onto intended victims' computers. The scammers distract the users while the ransomware encrypts files on the victims' computers, increasing the chances of obtaining money from the victims.

In view of the foregoing, it may be understood that there may be significant problems and/or shortcomings associated with traditional mechanisms in protecting against unauthorized tech support calls.

SUMMARY OF THE DISCLOSURE

Techniques for protecting against unauthorized technique support calls are disclosed. In one embodiment, the techniques may be realized as a system for protecting against unauthorized technique support calls comprising one or more computer processors configured to register a client security application installed on a client device. The client security application may be associated with a mobile device. The client device may be separate from the mobile device. The one or more computer processors may further be configured to receive a notification to start monitoring the client device. The one or more computer processors may further be configured to monitor activities of the client device. The one or more computer processors may further be configured to alert a user of the client device for security risks associated with the activities.

In accordance with other aspects of this embodiment, the client security application may be associated with a mobile device such that the client security application and a mobile security application installed on the mobile device share a common license key.

In accordance with other aspects of this embodiment, the notification may be triggered after a call commences on the mobile device.

In accordance with other aspects of this embodiment, the phone number of the call may not be recognized by the mobile phone.

In accordance with other aspects of this embodiment, the security risks may comprise launching an application.

In accordance with other aspects of this embodiment, the application may comprise at least one of Windows Alert Viewer, System Properties or Configurations, or Remote Desktop.

In accordance with other aspects of this embodiment, the client device may be at least one of a desktop or a laptop.

In another embodiment, the techniques may be realized as a method for protecting against unauthorized technique support calls. According to the method, a client security application installed on a client device may be registered. The client security application may be associated with a mobile device. The client device may be separate from the mobile device. A notification to start monitoring the client device may be received. Activities of the client device may be monitored. A user of the client device may be alerted for security risks associated with the activities.

In still another embodiment, the techniques may be realized as a non-transitory computer readable medium storing a computer-readable program for protecting against unauthorized technique support calls. The program may include computer-readable instructions to register a client security application installed on a client device. The client security application may be associated with a mobile device. The client device may be separate from the mobile device. The program may further include computer-readable instructions to receive a notification to start monitoring the client device. The program may further include computer-readable instructions to monitor activities of the client device. The program may further include computer-readable instructions to alert a user of the client device for security risks associated with the activities.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

In some embodiments, techniques for protecting against unauthorized tech support calls disclosed herein include establishing a correlation between a mobile device and a client device. After a call commences on the mobile device, the corresponding client device is notified and monitored. During the monitoring, if system level activities are identified, such as changing firewall settings, the user is alerted. In one embodiment, if a sequence of system level activities are identified, the user may be prevented from engaging in further system level activities.

Figure 1:
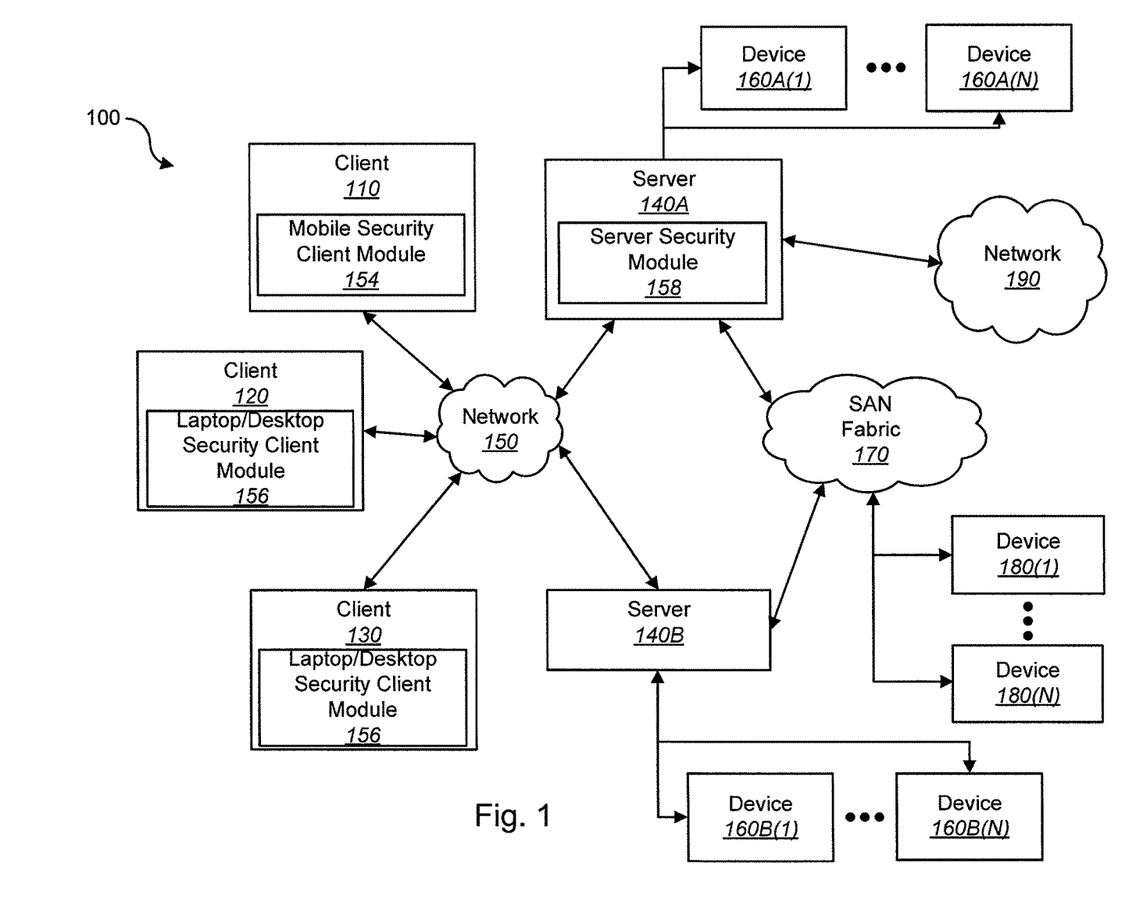
FIG. 1 shows a block diagram depicting a network architecture in accordance with an embodiment of the present disclosure.

FIG. 1 shows a block diagram depicting a network architecture 100 in accordance with an embodiment of the present disclosure. FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
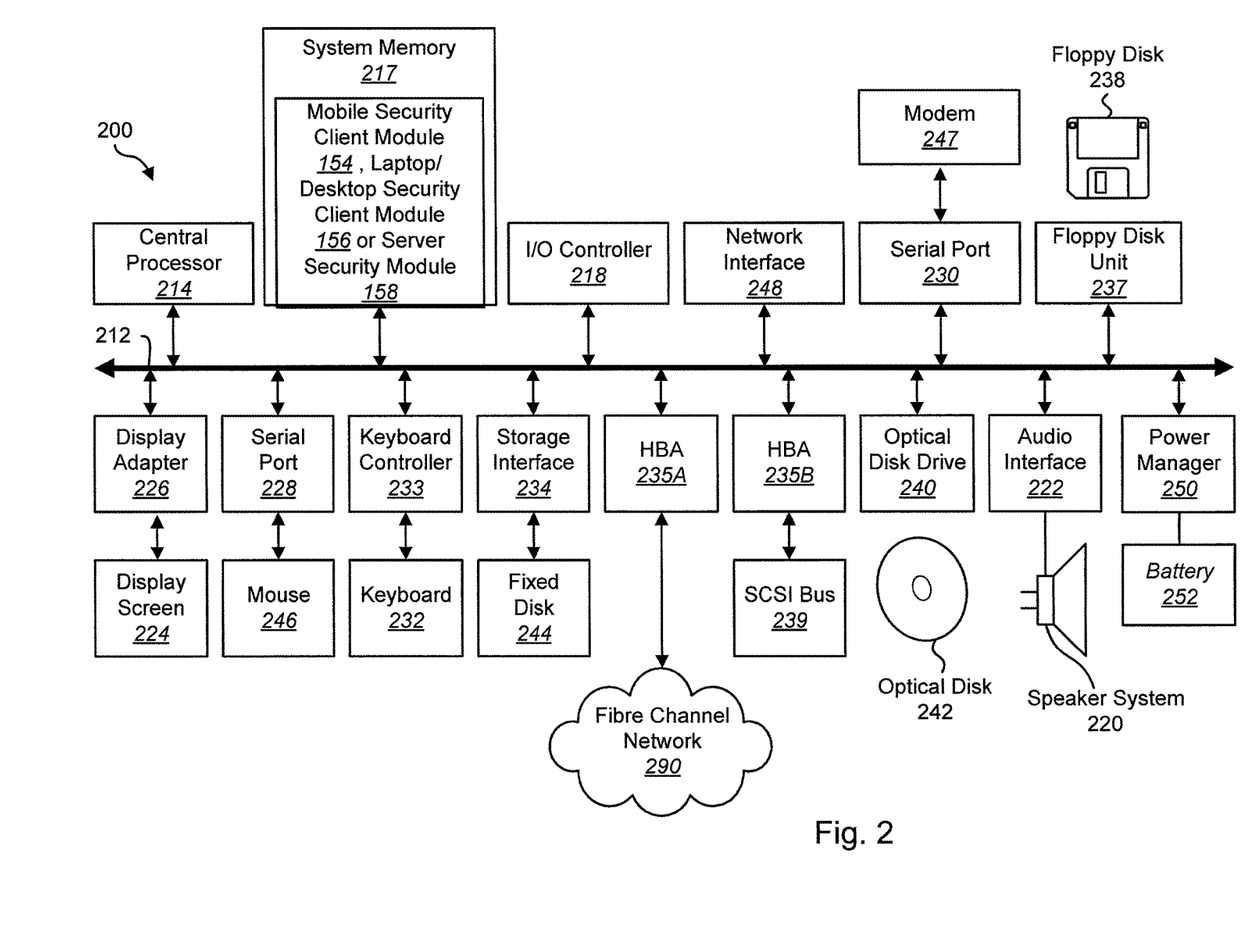
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110 may be smartphones, PDAs or other devices coupled via a wireless or wired connection to network 150. Clients 120 and 130 may be iPads, desktop computers, laptop computers, servers, other computers, or other devices coupled via a wireless or wired connection to network 150. Clients 110, 120, and 130 may receive data from user input, a database, a file, a web service, and/or an application programming interface. In some implementations, clients 110, 120, and 130 may specifically be network-capable mobile devices such as smartphones or tablets.

Servers 140A and 140B may be application servers, archival platforms, backup servers, database servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and 130 may contain one or more modules for implementation of protection against unauthorized tech support calls such as, for example, mobile security client module 154 or laptop/desktop security client module 156. Server 140A may include one or more modules such as, for example, server security module 158. Further, one or more portions of server security module 158 may reside at a network centric location. For example, server 140A may be a server, a firewall, a gateway, or other network element that may perform one or more actions to support management of system and network security elements. According to some embodiments, network 190 may be an external network (e.g., the Internet) and server 140A may be a gateway or firewall between one or more internal components and clients and the external network. According to some embodiments, analysis and approval of resource references including mobile security client module 154, laptop/desktop security client module 156 and/or server security module 158 may be implemented as part of a cloud computing environment. For example, laptop/desktop security client module 156 may be distributed to various clients and servers through a cloud computer environment. For another example, laptop/desktop security client module 156 may be updated at the network centric location and then distributed to various clients and servers.

FIG. 2 shows a block diagram of a computer system 200 in accordance with an embodiment of the present disclosure. Computer system 200 may be suitable for implementing methods and systems in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, mobile security client module 154, laptop/desktop security client module 156 and/or server security module 158 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
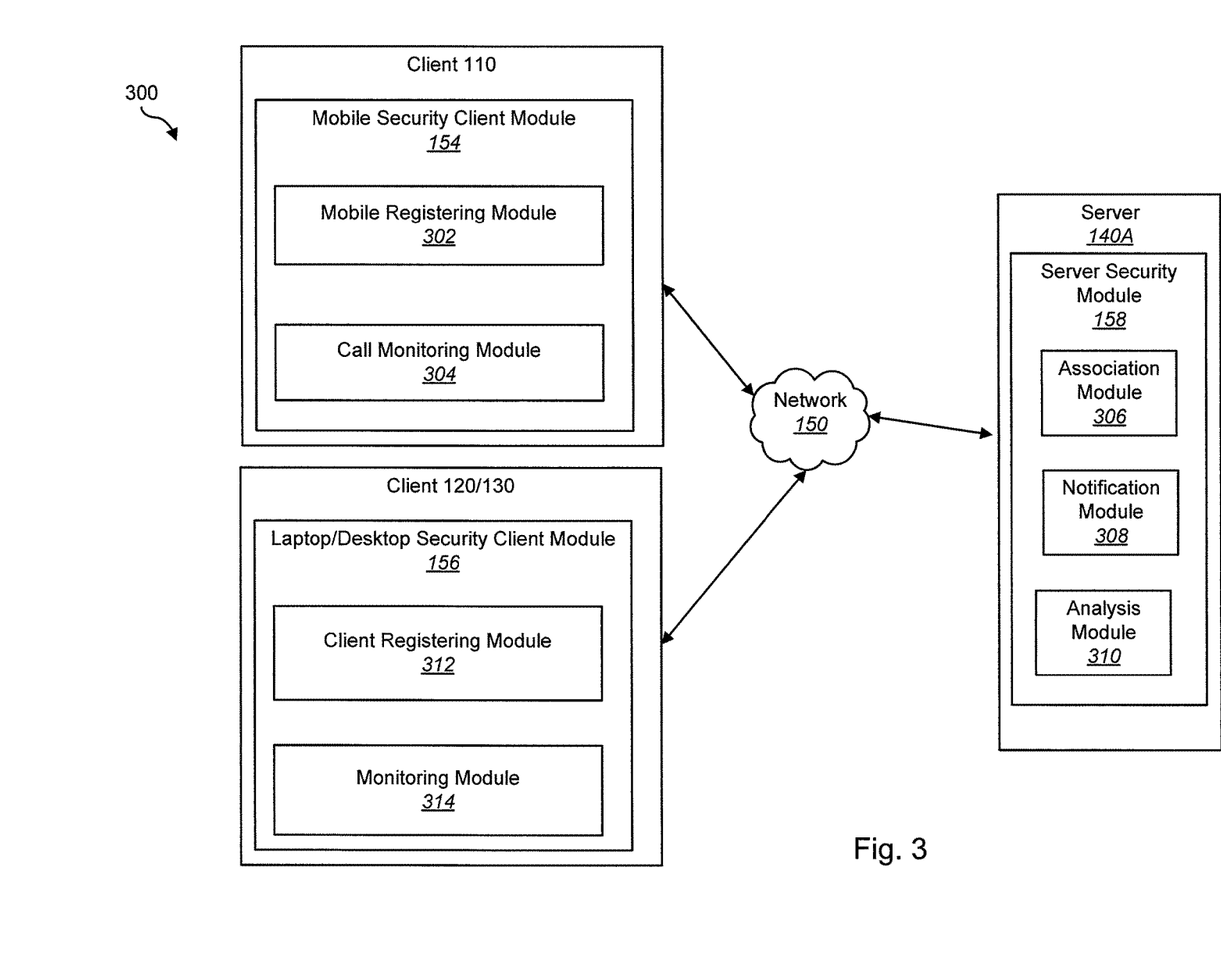
FIG. 3 shows a block diagram illustrating the system for protecting against unauthorized tech support calls shown in FIG. 1 in accordance with an embodiment of the present disclosure.

FIG. 3 shows a block diagram illustrating the system for protecting against unauthorized tech support calls shown in FIG. 1 in accordance with an embodiment of the present disclosure. Mobile security client module 154 may reside on a client, for example a smartphone such as an iPhone, an Android phone, or a Samsung phone. Any phone that may install some programs and receive voice calls may constitute client 110. In some embodiments, mobile security client module 154 includes mobile registering module 302 and call monitoring module 304. In some implementations, mobile registering module 302 and call monitoring module 304 communicate with server 140A. In other implementations, call monitoring module 304 communicate directly with client 120/130, through for example, network 150. In other words, server 140A may not be involved with respect to call commencement notification. In one embodiment, mobile registering module 302 communicates with sever 140A when a mobile security client application is installed and provides a license key associated with the mobile security client application to server 140A. In some embodiments, call monitoring module 304 monitors incoming calls to client 110. For example, if an incoming call is not recognized (e.g., listed) by client 110 (e.g., through an address book, a phonebook, or a contact list of the client 110) and commences, call monitoring module 304 notifies sever 140A or client 120/130 directly. A call commences when the call is answered by a user.

Still referring FIG. 3, server security module 158 may reside on a server computer. In some implementations, server security module 148 comprises association module 306, notification module 308, and analysis module 310. Association module 306 associates corresponding mobile devices and client devices. For example, as is described in further detail in subsequent sections, when or after a laptop/desktop security client program is installed on client 120/130, server 140A is provided with a license key associated with the installed laptop/desktop security client program. As described above, mobile device 110 also notifies server 140A of the license key of the mobile security client application. If the mobile security client application and the laptop/desktop client application share the same license key, client 110 and client 120/130 are correlated to each other. The same license key is one none-limiting embodiment of an association. Client 110 and client 120/130 may be associated with each other through other mechanisms, such as a common unique identifier. In some implementations, after client 110, through call monitoring module, notifies server 140A that a call has commenced on client 110, notification module 308 notifies client device 120/130 that corresponds to client 110. As described above, notification module 308 may make look up information stored by association module 306 and find corresponding client 120/130 via a common license key that is shared by mobile device 110 and client device 120/130. As is described in further detail subsequent sections, client 120/130 may provide to server 140A not only the license key of the installed laptop/desktop security client program/application, but also other information, such as its Mac address, machine name, IP address and may update such information (e.g., its IP address) periodically. Thus, notification module 308 may locate client 120/130 and notify client 120/130 that a call has commenced on its corresponding mobile device 110. In some implementations, such notification is performed by client 110. For example, client 110 may retrieve information from server 140A regarding its corresponding client device 120/130 (e.g., IP address of client device 120/130) and notifies client device 120/130 directly when a call commences on client 110. In some implementations, analysis module 310 may perform analysis of activities on client 120/130. For example, as is described in subsequent sections in further detail, once client 120/130 is notified to start monitoring, activities occurring on client 120/130 may be monitored by server 140A. Activities occurring on client 120/130 may be captured and sent to server 140A in the form of system logs or applications logs. In some embodiments, only a subset of system logs or application logs are sent to server 140A. In other words, client 120/130 through monitoring module 314 may filter out activities (e.g., a user checking an email) that does not pose security risks and only send to server 140A system logs or applications logs that potentially represents security risks. Analysis module 310 may have a knowledge base that identify system or application activities that pose security risks. Such knowledge base may be based on machine learning, information regarding reported tech support calls, etc. Client 110 and client 120/130 are separate device entities. In other words, client 110 may be a mobile device, such as an iPhone, and client 120/130 may be a laptop or a desktop device.

With continued reference to FIG. 3, client 120/130 may reside on a client device. The client device may be any electronic devices, such as a laptop, a desktop, an iPad, etc. Laptop and desktop are non-limiting embodiments of the client device 120. Laptop/desktop security client module 156 may include client registering module 312 and monitoring module 314. In some embodiments, client registering module 312 communicates with sever 140A when a laptop/desktop security client application is installed and provides a license key associated with the mobile security client application to server 140A. Client registering module 312 may also provide server 140A client 120/130's Mac address, machine name, IP address that enables server 140A to notify client 120/130 when a call commences on client 110. In some implementations, direct communications are established between client 110 and client 120/130 such that client 110 notifies client 120/130 directly when a call commences on client 110. Monitoring module 314 may monitor activities on client 120/130 in advanced heuristic mode when client 120/130 is notified that a call has commenced on associated client 110. Monitoring module 314 may filter out activities that do not pose security threats, such as a user reading an email. Monitoring module 314 may monitor system level activities on client 120/130, such as a firewall setting changes. In some embodiments, monitoring module 314 alerts a user. Such an alert may be embodied in a pop-up alert window, alerting a user that an unauthorized tech support call may be in process. In some implementations, monitoring module 314 may alert the user such that a system change is prevented. In one embodiment, monitoring module 314 identifies system activities such as launching "Windows Alert Viewer," "System Properties and Configurations," and "Remote Desktop," and/or other activity such as downloading files from the Internet. In some embodiments, a user may be prohibited from engaging in activities. For example, monitoring module 314 may recognize a sequence of activities, such as launching "Windows Alert Viewer" and editing an entry within the "Windows Alert Viewer" as a security risk and prohibit the user from editing the entry within the "Windows Alert Viewer."

Figure 4:
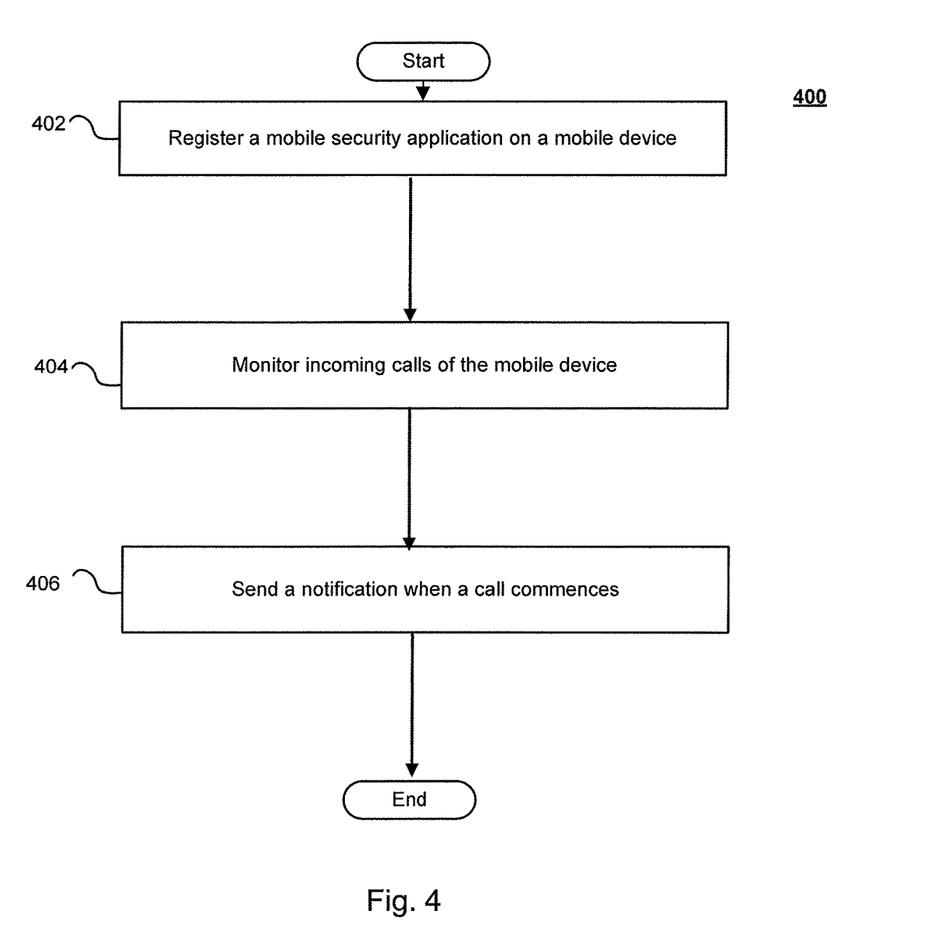
FIG. 4 shows a flowchart for protecting against unauthorized tech support calls in accordance with an example method of the present disclosure, with respect to a mobile device that is associated with a client device.

FIG. 4 shows a flowchart for protecting against unauthorized tech support calls in accordance with an example method of the present disclosure, with respect to a mobile device that is associated with a client device.

Method 400 may include registering a mobile security application on a mobile device (402); monitoring incoming calls of the mobile device (404); and sending a notification when a call commences (406).

Method 400 may include registering a mobile security application on a mobile device (402). In some implementations, as described above, registration information such as a license key associated with the mobile security application may be sent to a central server which identifies a corresponding client device with a client security application that share a common license key with the mobile security application. At step 404, incoming calls of the mobile device are monitored. At step 406, a notification is sent when a call commences on the mobile device. As described above, in one embodiment, a notification is sent if the incoming call is not recognized (e.g., by a phone book, etc.) of the mobile device. In one embodiment, the notification is sent to the central server which then notifies the corresponding client device. In another embodiment, the notification is sent to the corresponding client device directly as the mobile device may have retrieved information such as IP address, Mac address of the corresponding client device from the central server. In some implementations, a mobile device may correlate with more than one client devices. When a call commences on the mobile device, the more than one client devices may be monitored.

Figure 5:
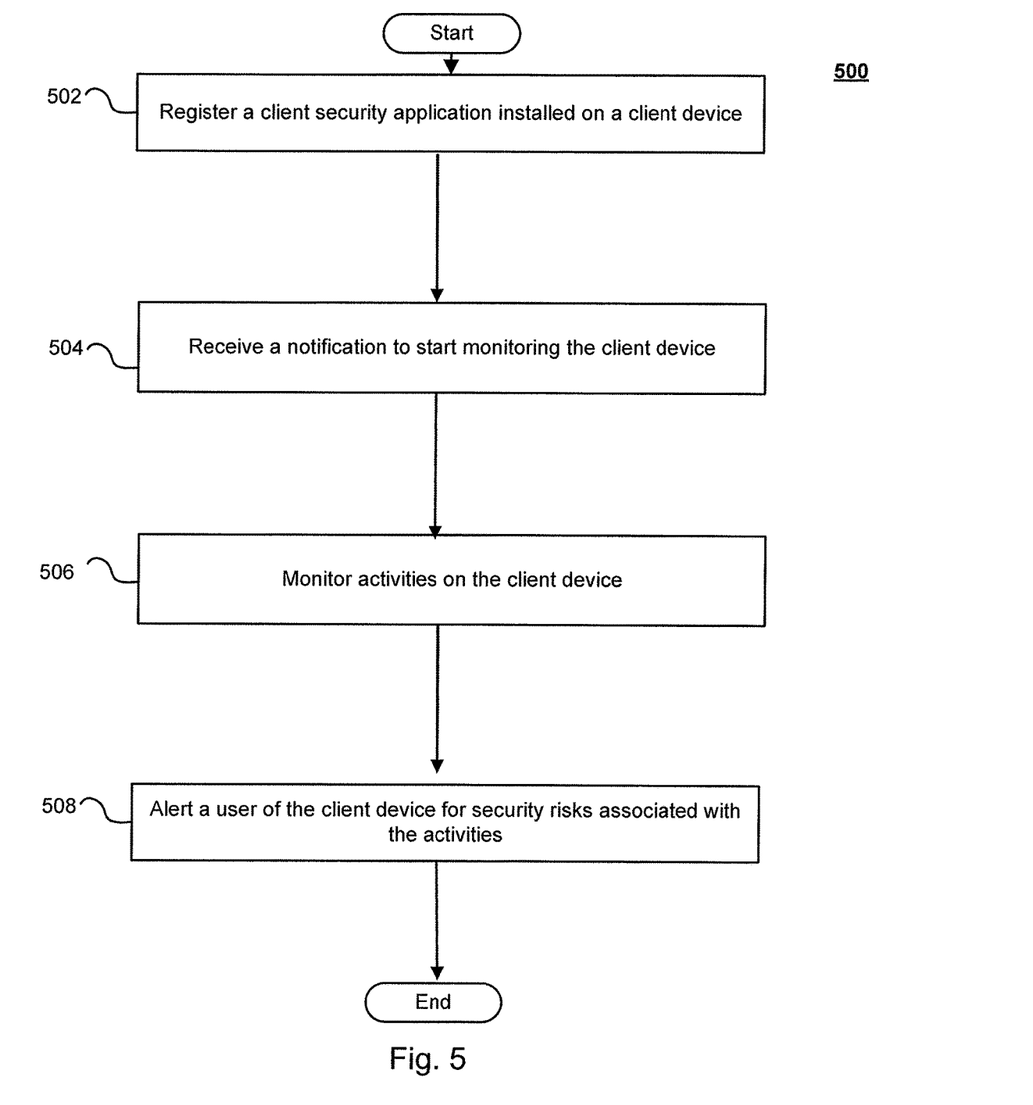
FIG. 5 shows a flowchart for protecting against unauthorized tech support calls in accordance with an example method of the present disclosure, with respect to a client device that is associated with a mobile device.

FIG. 5 shows a flowchart for protecting against unauthorized tech support calls in accordance with an example method of the present disclosure, with respect to a client device that is associated with a mobile device.

Method 500 may include registering a client security application installed on a client device (502); receiving a notification to start monitoring the client device (504); monitoring activities on the client device (506); and alert a user of the client device for security risks associated with the activities (508).

Method 500 may include registering a client security application installed on a client device (502). As described above, the client device may provide the central server with a license key associated with the installed client security application. In some embodiments, the client device may also provide its Mac Address, IP address, and/or machine name to the central server. The client device may also periodically update the central server regarding its IP address. At step 504, a notification to start monitoring the client device is received. As described above, the notification may be received from the central server or the corresponding mobile device. A notification may be received after a call commences on the corresponding mobile device. At step 506, activities on the client device are monitored. In some embodiments, as described above, system level activities, such as firewall setting changes are monitored. At step 508, a user of the client device is alerted for security risks associated with the activities. In some embodiments, as described above, the user may be prohibited from engaging in further activities.

At this point it should be noted that techniques for protecting against unauthorized tech support calls in accordance with the present disclosure as described above may involve the processing of input data and the generation of output data to some extent. This input data processing and output data generation may be implemented in hardware or software. For example, specific electronic components may be employed in a mobile registering module, call monitoring module, association module, notification module, analysis module, client registration module, monitoring module or similar or related circuitry for implementing the functions associated with techniques for protecting against unauthorized tech support calls in accordance with the present disclosure as described above. Alternatively, one or more processors operating in accordance with instructions may implement the functions associated with techniques for protecting against unauthorized tech support calls in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-implemented method for protecting against unauthorized tech support voice calls, at least a portion of the method being performed by a computing device comprising at least one processor, the method comprising:
   registering a client security application installed on a client computing device, wherein the client security application is associated with a mobile computing device such that the client security application and a mobile security application installed on the mobile computing device share a common license key, wherein the client computing device is separate from the mobile computing device;
   receiving a notification to start monitoring the client computing device, the notification being triggered after a voice call commences on the mobile computing device;
   monitoring activities of the client computing device for a change to the client computing device that presents security risks to the client computing device;
   alerting a user of the client computing device of the security risks to the client computing device associated with the activities; and
   preventing one or more of the activities of the client computing device to protect the client computing device from security risks associated with the one or more prevented activities.

2. The method of claim 1, wherein a phone number of the voice call is not recognized by the mobile computing device.

3. The method of claim 1 wherein the security risks comprise launching an application.

4. The method of claim 3, wherein the application comprises at least one of Windows Alert Viewer, System Properties or Configurations, or Remote Desktop.

5. The method of claim 1, wherein the client computing device is at least one of a desktop or a laptop.

6. The method of claim 1, wherein the alerting of the user includes visually alerting the user of the client computing device of the security risks to the client computing device associated with the activities.

7. The method of claim 6, wherein the visually alerting of the user includes visually displaying a pop-up alert window on the client computing device.

8. A non-transitory computer readable medium storing a computer-readable program for protecting against unauthorized tech support voice calls, comprising:
   computer-readable instructions to register a client security application installed on a client computing device, wherein the client security application is associated with a mobile computing device such that the client security application and a mobile security application installed on the mobile computing device share a common license key, wherein the client computing device is separate from the mobile computing device;
   computer-readable instructions to receive a notification to start monitoring the client computing device, the notification being triggered after a voice call commences on the mobile computing device;
   computer-readable instructions to monitor activities of the client computing device for a change to the client computing device that presents security risks to the client computing device;
   computer-readable instructions to alert a user of the client computing device of the security risks to the client computing device associated with the activities; and
   computer-readable instructions to prevent one or more of the activities of the client computing device to protect the client computing device from security risks associated with the one or more prevented activities.

9. The non-transitory computer readable medium according to claim 8, wherein a phone number of the voice call is not recognized by the mobile computing device.

10. The non-transitory computer readable medium according to claim 8, wherein the security risks comprise launching an application.

11. The non-transitory computer readable medium according to claim 10, wherein the application comprises at least one of Windows Alert Viewer, System Properties or Configurations, or Remote Desktop.

12. The non-transitory computer readable medium according to claim 8, wherein the alerting of the user includes visually alerting the user of the client computing device of the security risks to the client computing device associated with the activities.

13. The non-transitory computer readable medium according to claim 12, wherein the visually alerting of the user includes visually displaying a pop-up alert window on the client computing device.

* * * * *